US010559125B2

(12) United States Patent
Deshwal et al.

(10) Patent No.: US 10,559,125 B2
(45) Date of Patent: Feb. 11, 2020

(54) SYSTEM AND METHOD OF CONSTRUCTING BOUNDING VOLUME HIERARCHY TREE

(71) Applicant: Samsung Electronics Co., Ltd., Suwon-si (KR)

(72) Inventors: Ankur Deshwal, Uttar Pradesh (IN); Vikash Kumar, Jharkhand (IN); Keshavan Varadarajan, Bangalore (IN); Parikshit Kolipaka, Bangalore (IN); Soma Kohli, Bangalore (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 140 days.

(21) Appl. No.: 15/366,673

(22) Filed: Dec. 1, 2016

(65) Prior Publication Data

US 2017/0161944 A1 Jun. 8, 2017

(30) Foreign Application Priority Data

Dec. 2, 2015 (IN) .......................... 6474/CHE/2015
May 19, 2016 (KR) ........................ 10-2016-0061421

(51) Int. Cl.
*G06T 17/00* (2006.01)

(52) U.S. Cl.
CPC ........ *G06T 17/005* (2013.01); *G06T 2210/12* (2013.01)

(58) Field of Classification Search
CPC ... G06T 15/06; G06T 17/005; G06T 2210/12; G06T 15/005; G06T 15/50; G06T 15/506; G06T 1/20; G06T 2210/52; G06T 2210/61; G06T 2200/28; G06T 15/08; G06T 11/40; G06T 15/40; G06T 2200/04; G06T 2207/20021; G06T 2210/21; G06T 15/00; G06F 17/30327; G09G 2360/06
See application file for complete search history.

(56) References Cited

U.S. PATENT DOCUMENTS

| 8,072,460 | B2 | 12/2011 | Lauterbach et al. |
| 8,188,997 | B2 | 5/2012 | Dammertz et al. |
| 8,669,977 | B2 | 3/2014 | Ernst et al. |
| 8,773,422 | B1 | 7/2014 | Garland et al. |
| 8,823,736 | B2 | 9/2014 | Barringer et al. |
| 2008/0129734 | A1 | 6/2008 | Seung-Woo et al. |

(Continued)

FOREIGN PATENT DOCUMENTS

| CN | 101819675 B | 8/2011 |
| CN | 103021018 A | 4/2013 |

OTHER PUBLICATIONS

Deng, Yangdong, et al. "Toward real-time ray tracing: A survey on hardware acceleration and microarchitecture techniques." ACM Computing Surveys (CSUR) 50.4 (Aug. 2017): 58. (Year: 2017).*

(Continued)

*Primary Examiner* — Xiao M Wu
*Assistant Examiner* — Scott E Sonners
(74) *Attorney, Agent, or Firm* — F. Chau & Associates, LLC

(57) ABSTRACT

A method and apparatus to construct a bounding volume hierarchy (BVH) tree includes: generating 2-dimensional (2D) tiles including primitives; converting the 2D tiles into 3-dimensional (3D) tiles; and constructing the BVH tree based on the 3D tiles.

19 Claims, 8 Drawing Sheets

(56) References Cited

U.S. PATENT DOCUMENTS

| | | | |
|---|---|---|---|
| 2013/0033507 A1* | 2/2013 | Garanzha | G06T 1/00 345/522 |
| 2013/0235049 A1* | 9/2013 | Karra | G06T 1/20 345/505 |
| 2013/0343655 A1 | 12/2013 | Tai et al. | |
| 2014/0340412 A1 | 11/2014 | Doyle et al. | |
| 2015/0279092 A1* | 10/2015 | Ganestam | G06T 17/005 345/419 |

OTHER PUBLICATIONS

C. Lauterbach, et al., "Fast BVH Construction on GPUs," *Computer Graphics Forum*, vol. 28, No. 2, Mar. 27, 2009 (10 pages, in English).

J. Pantaleoni, et al., "HLBVH: Hierarchical LBVH Construction for Real-Time Ray Tracing of Dynamic Geometry," *High Performance Graphics*, Jun. 2010 (9 pages, in English).

Won-Jong Lee, et al., "SGRT: A Mobile GPU Architecture for Real-Time Ray Tracing,"*Proceedings of the $5^{th}$ High-Performance Graphics Conference*, Anaheim, California, Jul. 19-21, 2013 (11 pages, in English).

Michael Doyle, et al., "HWBVH Hardware Construction of BVHs for Real-Time Ray-Tracing,"*Trinity College Dublin, The University of Dublin*, Licensing Opportunity from Trinity College, Dublin Ireland, Aug. 2015 (1 page in English).

\* cited by examiner

SYSTEM AND METHOD OF CONSTRUCTING BOUNDING VOLUME HIERARCHY TREE

CROSS-REFERENCE TO RELATED APPLICATIONS

This application claims the benefit under 35 USC 119(a) of Korean Patent Application No. 10-2016-0061424 filed on May 19, 2016 in the Korean Intellectual Property Office, and Indian Patent Application No. 6474/CHE/2015 filed on Dec. 2, 2015, in the Controller General of Patents Designs and Trademarks, the entire disclosures of which are incorporated herein by reference for all purposes.

BACKGROUND

1. Field

The following description relates to a method and system for constructing a bounding volume hierarchy (BVH) tree.

2. Description of the Related Art

Hierarchical structures such as logical tree structures are known in various technical fields and may be used to organize information in a logical form in order to facilitate storage and retrieval of the information. When the hierarchical structures are constructed, the highest node or a "root" of a logical tree may include the most general information, and its descendent nodes (i.e., child nodes or grandchild nodes) may provide additional information in a particular form. It is desirable to navigate the logical tree via the shortest path in the shortest amount of time in order to store or retrieve information.

In graphics processing and rendering, ray tracing, which is promising technology to enhance the visual experience of graphics applications, uses hierarchical structures to organize information. Ray tracing involves a technique for determining the visibility of an object (e.g., a geometric primitive) based on a given point in space, for example, an eye or a camera perspective. Primitives of a particular scene, which are to be rendered, are typically located in nodes, and the nodes are organized within a hierarchical tree. Ray tracing may include a first operation of "node traversal" whereby nodes of the tree are traversed in a particular manner in an attempt to locate nodes having primitives, and a second operation of "primitive intersection" in which a ray intersects one or more primitives within a located node so as to produce a particular visual effect.

Prior to the node traversal and primitive intersection operations, a hierarchical structure may be built to efficiently organize objects. The hierarchical structure may be constructed by partitioning a higher level node (e.g., a parent node) into two or more lower level nodes (e.g., child nodes). Each child node defines successively smaller spaces and includes successively fewer objects, compared to the parent node. The partition may be repeated for each of the child nodes, whereby each child is further partitioned into two or more grandchild nodes. Compared with the child nodes, each grandchild node defines successively smaller spaces or includes successively fewer objects.

A ray tracing technique may provide graphics rendering of high quality, but is used in offline rendering due to its high computational cost and requirements. With the recent advancement in available computation power, ray tracing has been demonstrated to be possible at interactive frame rates, even on mobile platforms. Ray tracing has even been successfully implemented in commercial mobile products in the form of hybrid rendering. Hybrid rendering refers to the use of a combination of rasterization and ray tracing based techniques for graphics rendering. In conventional ray tracing systems, acceleration structures such as a Bounded Volume Hierarchy (BVH) tree and a K-dimensional (KD) tree have been used. In this case, structures such as a BVH may be generated using a central processing unit (CPU). However, there have been attempts to generate structures using a parallel processor architecture.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a method of constructing a bounding volume hierarchy (BVH) tree includes: generating 2-dimensional (2D) tiles including primitives; converting the 2D tiles into 3-dimensional (3D) tiles; and constructing the BVH tree based on the 3D tiles.

The 3D tiles may be sequentially received to construct the BVH tree.

The generating of the 2D tiles may include: receiving the primitives; and generating the 2D tiles by sorting the primitives into different bins, based on locations of vertices of the primitives.

The constructing of the BVH tree may include: receiving a candidate primitive from one of the 3D tiles; constructing a leaf node corresponding to an upper layer of the BVH tree based on the candidate primitive; generating a parent node corresponding to the leaf node and associated with a parent node identifier; determining an availability of the parent node identifier in a BVH cache; and constructing a lower layer of the BVH tree based on the availability of the parent node identifier.

The constructing of the lower layer may include: determining whether a bit vector is set, wherein the bit vector indicates the availability of the parent node identifier; fetching information regarding a first child node corresponding to the parent node from the BVH cache, in response to the bit vector being set; declaring the leaf node as a second child node corresponding to the parent node; and merging a bounding box corresponding to the first child node with a bounding box corresponding to the second child node.

The constructing of the lower layer may include: determining whether a bit vector is not set; determining whether the parent node identifier is available in the BVH cache, in response to the bit vector not being set; fetching information regarding a first child node corresponding to the parent node from the BVH cache, in response to the parent node identifier being available; declaring the leaf node as a second child node corresponding to the parent node; and merging a bounding box corresponding to the first child node with a bounding box corresponding to the second child node.

The constructing of the lower layer may include: determining whether a bit vector is set; determining whether the parent node identifier is available in the BVH cache, in response to the bit vector not being set; declaring a first child node corresponding to the parent node as the leaf node, in response to the parent node identifier not being available; and storing information regarding the first child node in the BVH cache.

A non-transitory computer-readable medium may store instructions that, when executed by a processor, cause the processor to perform the method.

In another general aspect, a method of constructing a bounding volume hierarchy (BVH) tree includes: receiving a leaf node corresponding to an upper layer of the BVH tree; generating a parent node corresponding to the leaf node and associated with a parent node identifier; determining an availability of the parent node identifier in a BVH cache; and constructing a lower layer of the BVH tree based on the availability of the parent node identifier.

The method may further include: determining whether a bit vector is set, wherein the bit vector indicates the availability of the parent node identifier; fetching information regarding a first child node corresponding to the parent node from the BVH cache, in response to the bit vector being set; declaring the leaf node as a second child node corresponding to the parent node; and merging a bounding box corresponding to the first child node with a bounding box corresponding to the second child node.

The constructing of the lower layer may include: determining whether a bit vector is set; determining whether the parent node identifier is available in the BVH cache, in response to the bit vector not being set; fetching information regarding a first child node corresponding to the parent node from the BVH cache, in response to the parent node identifier being available; declaring the leaf node as a second child node corresponding to the parent node; and merging a bounding box corresponding to the first child node with a bounding box corresponding to the second child node.

The constructing of the lower layer may include: determining whether a bit vector is set; determining whether the parent node identifier is available in the BVH cache, in response to the bit vector not being set; declaring a first child node corresponding to the parent node as the leaf node, in response to the parent node identifier not being available; and storing information regarding the first child node in the BVH cache.

The leaf node may be sequentially received to construct the BVH tree.

A non-transitory computer-readable medium may store instructions that, when executed by a processor, cause the processor to perform the method.

In another general aspect, a system to construct a bounding volume hierarchy (BVH) tree includes: a binning processor configured to generate 2-dimensional (2D) tiles including primitives and convert the 2D tiles into 3-dimensional (3D) tiles; and a graphics processing unit (GPU) including a BVH constructor configured to construct the BVH tree based on the 3D tiles.

The 3D tiles may be sequentially received to construct the BVH tree.

The binning processor is may be configured to receive the primitives and generate the 2D tiles by sorting the primitives into different bins based on locations of vertices of the primitives.

The constructor may be configured to: receive candidate primitives from at least one of the 3D tiles; construct a leaf node corresponding to an upper layer of the BVH tree based on the candidate primitives; generate a parent node corresponding to the leaf node and associated with a parent node identifier; determine an availability of the parent node identifier in a BVH cache; and construct a lower layer of the BVH tree based on the availability of the parent node identifier.

In another general aspect, a system for constructing a bounding volume hierarchy (BVH) tree includes: a graphics processing unit (GPU) including a BVH constructor configured to receive a leaf node corresponding to an upper layer of the BVH tree, generate a parent node corresponding to the leaf node and associated with a parent node identifier, determine an availability of the parent node identifier in a BVH cache, and construct a lower layer of the BVH tree based on the availability of the parent node identifier.

The BVH constructor may be configured to: determine whether a bit vector is set, wherein the bit vector indicates the availability of the parent node identifier; fetch information regarding a first child node corresponding to the parent node from the BVH cache, in response to the bit vector being set; declare the leaf node as a second child node corresponding to the parent node; and merge a bounding box corresponding to the first child node with a bounding box corresponding to the second child node.

Other features and aspects will be apparent from the following detailed description, the drawings, and the claims.

DETAILED DESCRIPTION

Figure 1:
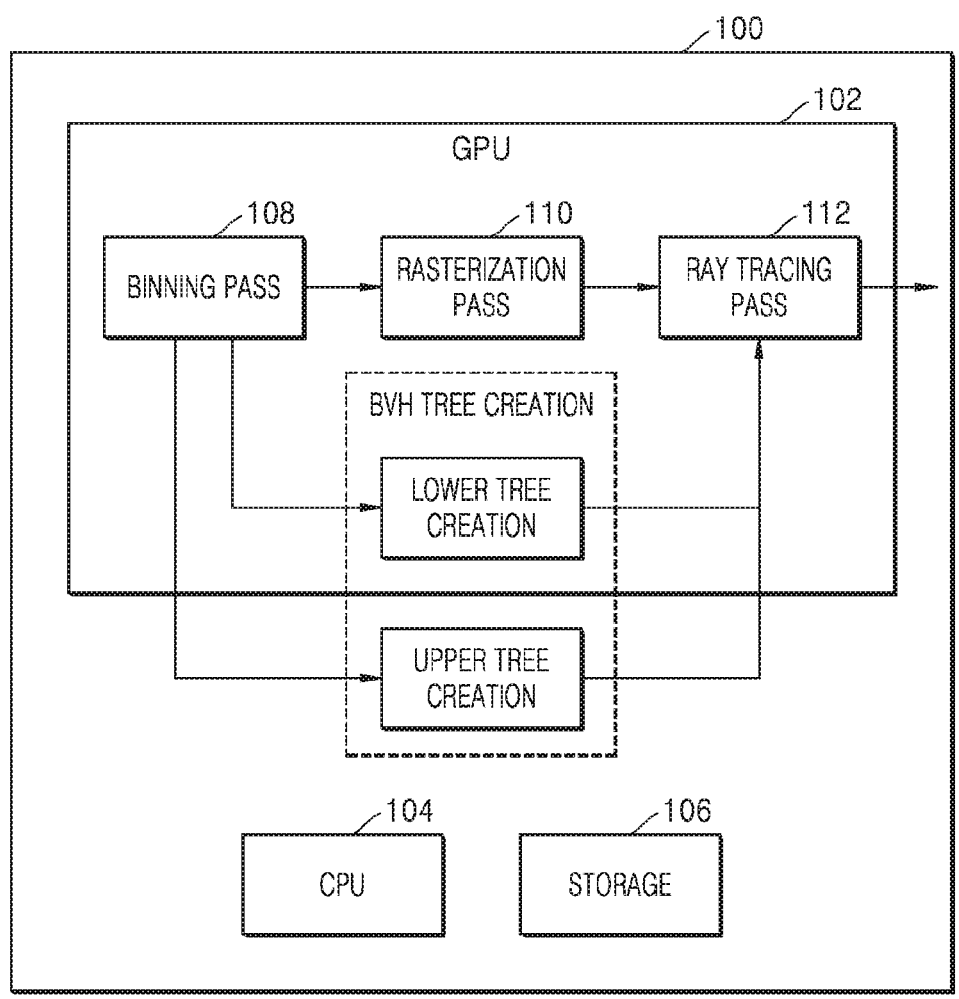
FIG. 1 is a block diagram of a system for constructing a bounding volume hierarchy (BVH) tree, according to an embodiment.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

As used herein, the term "and/or" includes any one and any combination of any two or more of the associated listed items.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

The features of the examples described herein may be combined in various ways as will be apparent after an understanding of the disclosure of this application. Further, although the examples described herein have a variety of configurations, other configurations are possible as will be apparent after an understanding of the disclosure of this application.

Unlike existing systems and methods, a method according to the examples provided herein is used to optimize a BVH tree by using a central processing unit (CPU) and a graphics processing unit (GPU). According to an example, the construction of the BVH tree is distributed to the CPU, the GPU, and an accelerator in order to repeatedly perform a computation operation and a memory read/write operation used in a tile-based mobile GPU. In an embodiment, a hierarchical linear BVH technique is used to construct a 2-layer BVH tree including an upper layer and a lower layer. The upper layer of the BVH tree may be constructed using a surface area heuristic (SAH), and the lower layer thereof may be constructed using a linear BVH (LBVH). In an embodiment, a structure of an accelerator driven by a compute shader of the GPU is provided to construct the lower layer of the BVH tree.

A method and system according to an example disclosed herein uses cache-based fixed function hardware to construct the BVH tree. In an embodiment, the BVH tree may be constructed using the cache based fixed function hardware. Unlike existing methods, the cache-based fixed function hardware may sequentially receive 3D tiles to construct the BVH tree. Therefore, BVH tree construction and bounding volume renewal may be performed by the cache-based fixed function hardware. Moreover, the cache-based fixed function hardware may improve LBVH construction by using "Fast and Simple Agglomerative LBVH".

Unlike existing methods, a method and system according to examples disclosed herein provide a separate pipeline to construct the BVH tree for hybrid rendering, where the BVH tree construction (i.e., lower tree creation and upper tree creation) is performed in parallel with a rasterization pass. In an embodiment, the upper layer of the BVH tree is constructed in the CPU or the GPU shader cores. The lower layer of the BVH tree is constructed in the GPU using the cache-based fixed function hardware. Thus, the pipeline utilizes the CPU and the cache-based fixed function hardware in the GPU for efficient execution of BVH construction in context of hybrid rendering for tile based mobile GPU architectures.

FIG. 1 is a block diagram of a system 100 to construct a BVH tree, according to an embodiment. The system 100 indicates a pipeline constructing the BVH tree for hybrid rendering. According to embodiments, the system 100 includes a GPU, or graphics processor 102, a CPU, or central processor 104, and a memory or storage 106. The GPU 102 includes a binning pass 108, a rasterization pass 110, and a ray tracing pass 112.

The CPU 104 performs at least one operation to construct the BVH tree. The CPU 104 may independently construct the BVH tree or may construct the BVH tree in communication with the GPU 102. It is to be understood that a portion of the BVH tree is constructed in the CPU 104 and another portion of the BVH tree is constructed in the GPU 102 to create the BVH tree. In an embodiment, upper tree creation is performed by the GPU 102 or the CPU 104.

The storage 106 is configured to store one or more primitives in an image. In an embodiment, the GPU 102 and the CPU 104 communicate with the storage unit 106 in order to obtain the one or more primitives. The storage 106 may include one or more computer-readable storage media. The storage 106 may include non-volatile storage elements. Examples of such non-volatile storage elements include magnetic hard discs, optical discs, floppy discs, flash memories, forms of electrically programmable memories (EPROM), and forms of electrically erasable and programmable memories (EEPROM). In some examples, the storage 106 is configured to store larger amounts of information than the memory. In certain examples, a non-transitory storage medium stores data that may, over time, change (e.g., in Random Access Memory (RAM) or cache).

In some embodiments, although not shown in FIG. 1, the binning pass 108 includes various components to create the 2D tiles. In the binning pass 108, the primitives are received as inputs. The 2D tiles are created by sorting respective primitives into different bins based on locations of vertices of the primitives. Thus, the inputs to the binning pass 108 may include the primitives, and outputs of the binning pass 108 may include the 2D tiles. The various components of the binning pass 108 are described with reference to FIG. 3.

The 2D tiles created during the binning pass 108 are used in the rasterization pass 110. The rasterization pass 110 generates data which is used by a ray generation block (not shown in FIG. 1) to generate rays for the ray tracing pass 112.

The outputs of the binning pass 108, in which the 2D tiles may be included, are provided as inputs for the BVH creation. During lower tree creation and upper tree creation, each 2D tile is converted into 3D tiles. In an embodiment, the BVH tree (i.e., a lower tree and an upper tree) is created based on the 3D tiles.

In an embodiment, the 3D tiles are sequentially received from the binning pass 108 to construct the BVH tree. The upper layer of the BVH tree may be constructed in the CPU 104 or the GPU shader core. The lower layer of the BVH tree may be constructed in the GPU by using cache-based fixed function hardware.

In an embodiment, each 3D tile is converted into the lower layer of the BVH tree using the cache-based fixed function hardware. The cache-based fixed function hardware will be described later with reference to FIG. 4.

In an embodiment, a candidate primitive is received from the 3D tiles, and a leaf node is constructed based on the candidate primitive. The leaf node may correspond to the upper layer of the BVH tree.

Therefore, the BVH tree creation includes the lower tree creation and the upper tree creation. The created BVH tree may be used by the ray tracing pass 112 to create an image. Unlike the conventional systems and methods, the BVH tree may be constructed using the GPU 102 and the CPU 104. According to an embodiment, the BVH construction is distributed to the GPU 102 and the CPU 104, and the BVH construction is performed in parallel with the rasterization pass 110.

FIG. 1 only shows example components of the system 100. However, the system 100 may include other components, in addition to the components shown in FIG. 1. Also, the GPU 102 may include units or sub-units that may communicate with one another. Functions of one or more units may be combined by a single unit or may be distributed to different units.

Figure 2:
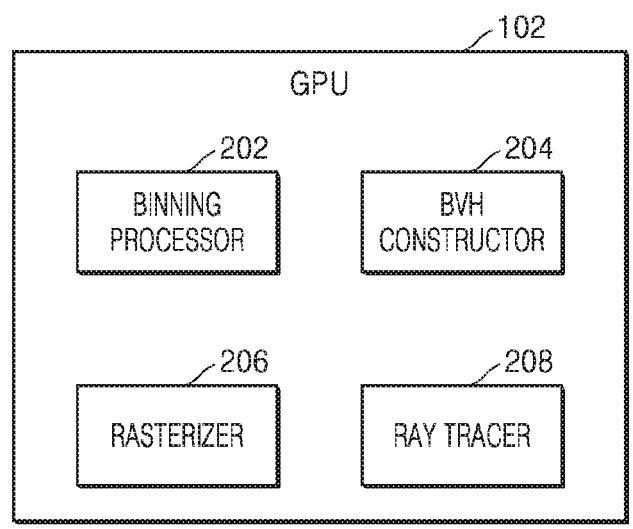
FIG. 2 is a diagram showing various components of a graphics processing unit (GPU), according to an embodiment.

FIG. 2 shows various units of the GPU 102, according to an embodiment. The GPU 102 includes a binning processor 202, a BVH constructor 204, a rasterizer 206, and a ray tracer 208.

In an embodiment, the binning processor 202 is configured to receive the primitives and to create the 2D tiles. The binning processor 202 is configured to create the 2D tiles by sorting each primitive into different bins based on locations of the vertices of each primitive. Each 2D tile includes information regarding the primitives which belong to a tile. Furthermore, the binning processor 202 is configured to convert each 2D tile (among the 2D tiles) into the 3D tiles.

The BVH constructor 204 is configured to perform one or more operations to construct the BVH tree. The BVH tree is constructed based on the 3D tiles received from the binning processor 202. The BVH constructor 204 may include various components to construct the BVH tree. Examples of the various components of the BVH constructor 204 are described below with reference to FIG. 4.

In an embodiment, the BVH constructor 204 is configured to receive the 3D tiles sequentially (one by one) to construct the BVH tree. The BVH constructor 204 is configured to receive a candidate primitive from the 3D tiles. The BVH constructor 204 is configured to construct the leaf node corresponding to the upper layer of the BVH tree based on the received candidate primitive. The BVH constructor 204 is configured to generate a parent node corresponding to the leaf node. Each parent node may be associated with a parent node identifier. The BVH constructor 204 is configured to determine the availability of the parent node identifier in a BVH cache. Also, the BVH constructor 204 is configured to construct the lower layer of the BVH tree based on the availability of the parent node identifier in the BVH cache.

In an embodiment, the rasterizer 206 is configured to generate data which is used for ray generation in the ray tracing pass 112.

In an embodiment, the ray tracer 208 is configured to create the image. The image is created using the BVH tree constructed by the BVH constructor 204. The ray tracer 208 is configured to receive the BVH tree from the BVH constructor 204.

FIG. 2 only shows example components of the GPU 102. However, the GPU 102 may further include other components, in addition to the components shown in FIG. 2. Also, the GPU 102 may include units or sub-units that may communicate with one another. Functions of one or more units may be combined by a single unit or may be distributed to different units.

Figure 3:
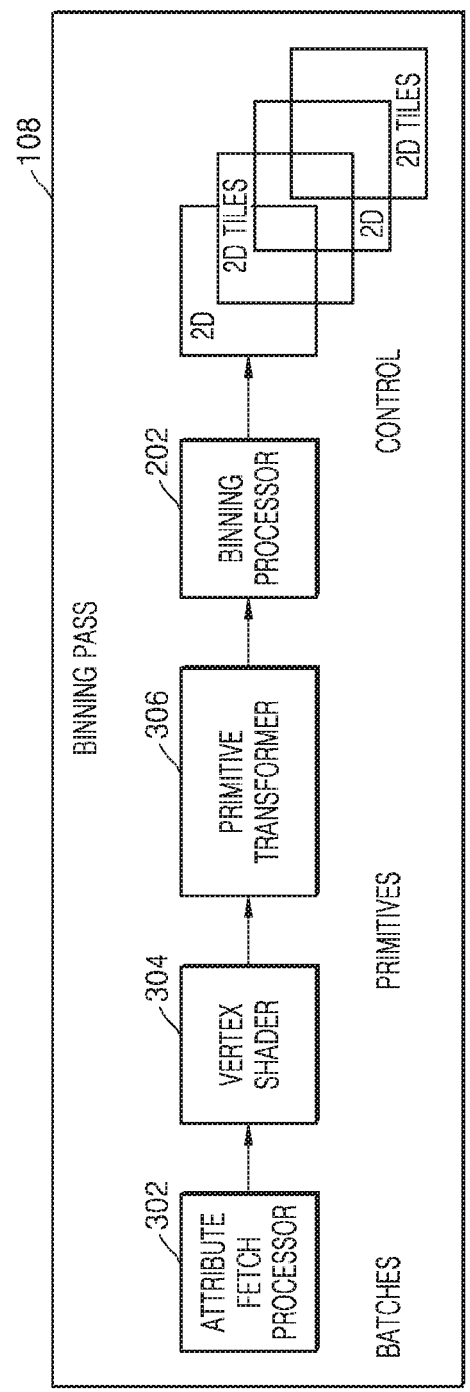
FIG. 3 is a diagram showing a process of generating 2-dimensional (2D) tiles during a binning pass, according to an embodiment.

FIG. 3 is a diagram showing a process of generating 2D tiles in a binning pass 108 of tile based rendering, according to an embodiment. The binning pass 108 is performed using an attribute fetch processor 302, a vertex shader 304, a primitive transformer 306, and the binning processor 202.

The attribute fetch processor 302 is configured to fetch attributes of vertices from the storage 106.

The vertex shader 304 is configured to transform a 3D position of each vertex of a primitive in a virtual space to a 2D coordinate. The vertex shader 304 may be configured to manipulate various properties such as a position, a color and a texture coordinate of the primitive, but may not create new vertices for the primitive.

The primitive transformation block 306 is configured to transform the primitives into tiles.

In the binning pass 108, the primitives (for example, triangles) are received from the vertex shader 304.

In an embodiment, the binning processor 202 is configured to receive the primitives. Also, the binning processor 202 may be configured to create the 2D tiles by sorting each primitive into different bins based on locations of the vertices of the primitives. Each of the created 2D tiles may include information regarding the primitives which belong to the 2D tile.

Figure 4:
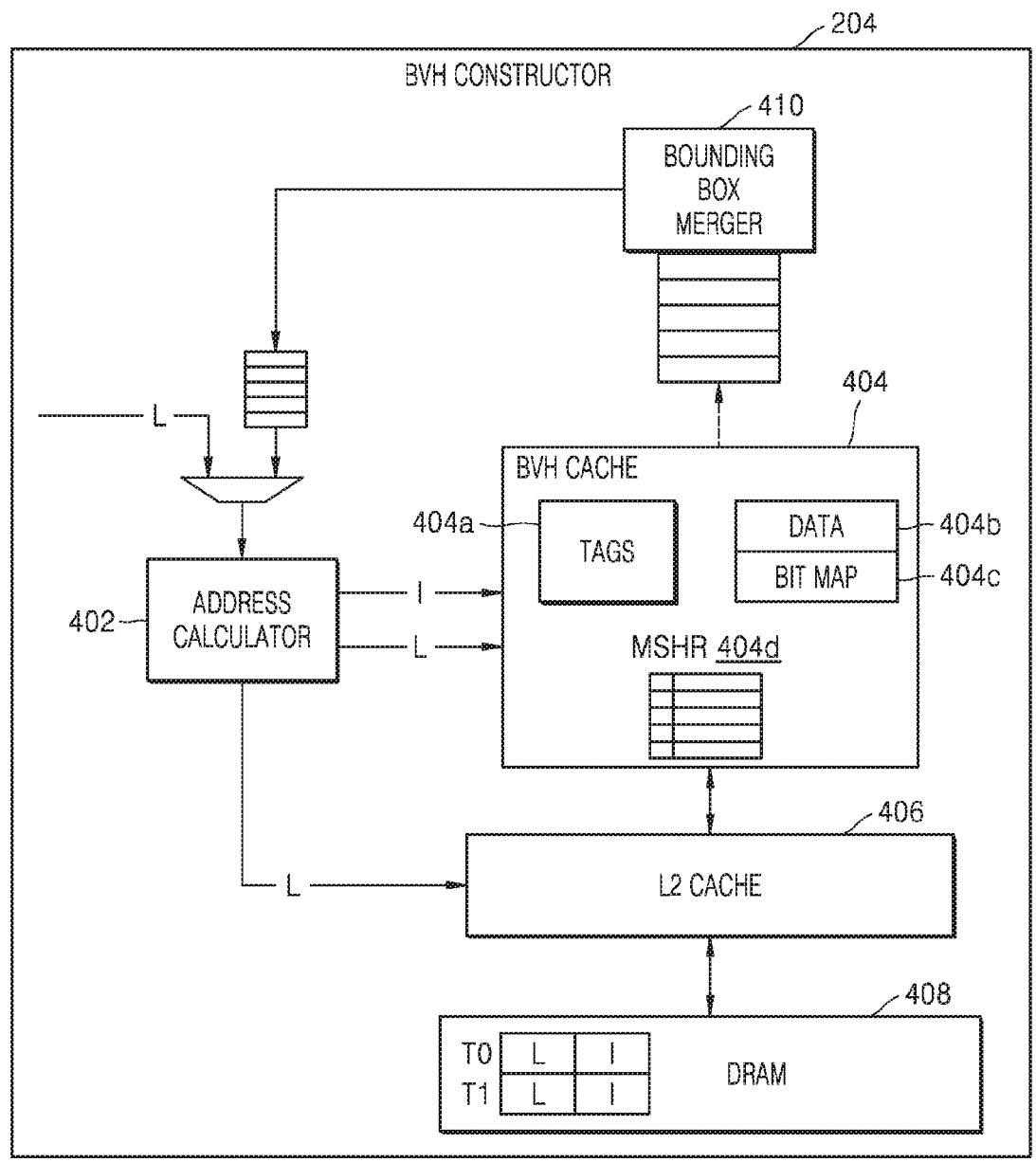
FIG. 4 is a diagram showing a hardware structure that constructs a BVH tree, according to an embodiment.

FIG. 4 is a diagram showing a hardware structure that constructs the BVH tree, according to an embodiment. Referring to FIG. 4, the BVH constructor 204 includes the cache-based fixed function hardware. The cache-based fixed function hardware includes an address calculator 402, a BVH cache 404, an L2 cache 406, Dynamic Random Access Memory (DRAM) 408 and a Bounding Box (BBox) merger 410. The address calculator 402 and the BBox merger 410 are fixed function hardware.

The BVH cache 404 includes tags 404a, data 404b, a bit map 404c and a Miss State Handle Register (MSHR) 404d.

The primitives are provided to the cache-based fixed function hardware. In an embodiment, the primitives are sorted based on Morton codes. The BVH constructor 204 is configured to receive the candidate primitive from the 3D tiles. In an embodiment, the 3D tiles are obtained by the BVH constructor 204. Various operations for obtaining the 3D tiles are described later with reference to FIG. 5.

In an embodiment, the leaf node is constructed based on the candidate primitive. The constructed leaf node may correspond to the upper layer of the BVH tree. Thus, each primitive may be constructed as a leaf node in the BVH constructor 204.

As shown in FIG. 4, when the leaf node L is received, the address calculator 402 calculates an address of the leaf node L using a base address and an offset, based on the position of the leaf node L in the BVH tree. After computing the address of the leaf node L, the address calculator 402 sends an L2 write request to the L2 cache 406 to write to the computed address of the leaf node L in the L2 cache 406. Also, the address calculator 402 sends the leaf node L to the BVH cache 404 in order to generate the parent node corresponding to the leaf node L. In an embodiment, each parent node is uniquely identified by a parent node identifier that corresponds to the leaf node L. Moreover, the address calculator 402 may receive an intermediate node I from the BB merger 410 and may transmit the received intermediate node I to the BVH cache 404 until the last node is generated.

In an embodiment, the availability of the parent node in the BVH cache 404 is determined by querying BVH cache 404 with the parent node identifier.

In an embodiment, the availability of the parent node identifier in the BVH cache 404 is determined based on a bit vector. The bit vector may be determined to check the availability of the parent node in the BVH cache 404. If the bit vector is set (for example, if the bit vector is set to one) then, the bit vector indicates that a first child of the parent node is available in the L2 cache 406. In other words, when the bit vector is set, the first child node corresponding to the parent node is evicted to the L2 cache 406 from the BVH cache 404 before arrival of the second child node corresponding to the parent node. Thus, the BVH cache 404 sends a request for reading the parent node to the L2 cache 406, and an entry is created in the MSHR 404d.

After fetching the first child node from the BVH cache 404, the leaf node may be declared as a second child node corresponding to the parent node.

Also, the BVH cache 404 sends the first child node and the second child node to the BBox merger 410. The BBox merger 410 receives the first child node and the second child corresponding to the parent node.

If the bit vector corresponding to the parent node is not set, two scenarios are possible. In the first scenario, a determination is made to check whether the parent node identifier is available in the BVH cache 404. If the parent node identifier is available in the BVH cache 404, the first child node corresponding to the parent node is fetched from the BVH cache 404. After the first child node is fetched from the BVH cache 404, the leaf node is declared as the second child node corresponding to the parent node. Moreover, the BVH cache 404 sends the first child node and the second child node to the BBox merger 410. The BBox merger 410 receives the first child node and the second child corresponding to the parent node.

In the second scenario, a determination is made to check whether the parent node identifier is available in the BVH cache 404. If the parent node identifier is unavailable in the BVH cache 404, the leaf node is declared as the first child node corresponding to the parent node. Moreover, the BVH cache 404 stores information regarding the first child node corresponding to the parent node. In an embodiment, an entry is made in the BVH cache 404 for the parent node. Eviction from the BVH cache 404 may be performed when all the entries in the cache are filled.

In addition, the DRAM 408 may include an array of a leaf node L and an array of an intermediate node I in each tile. In an example, the DRAM 408 includes an array of each of the leaf node L and the intermediate node I in a tile T0 and an array of each of the leaf node L and the intermediate node I in a tile T1.

Figure 5:
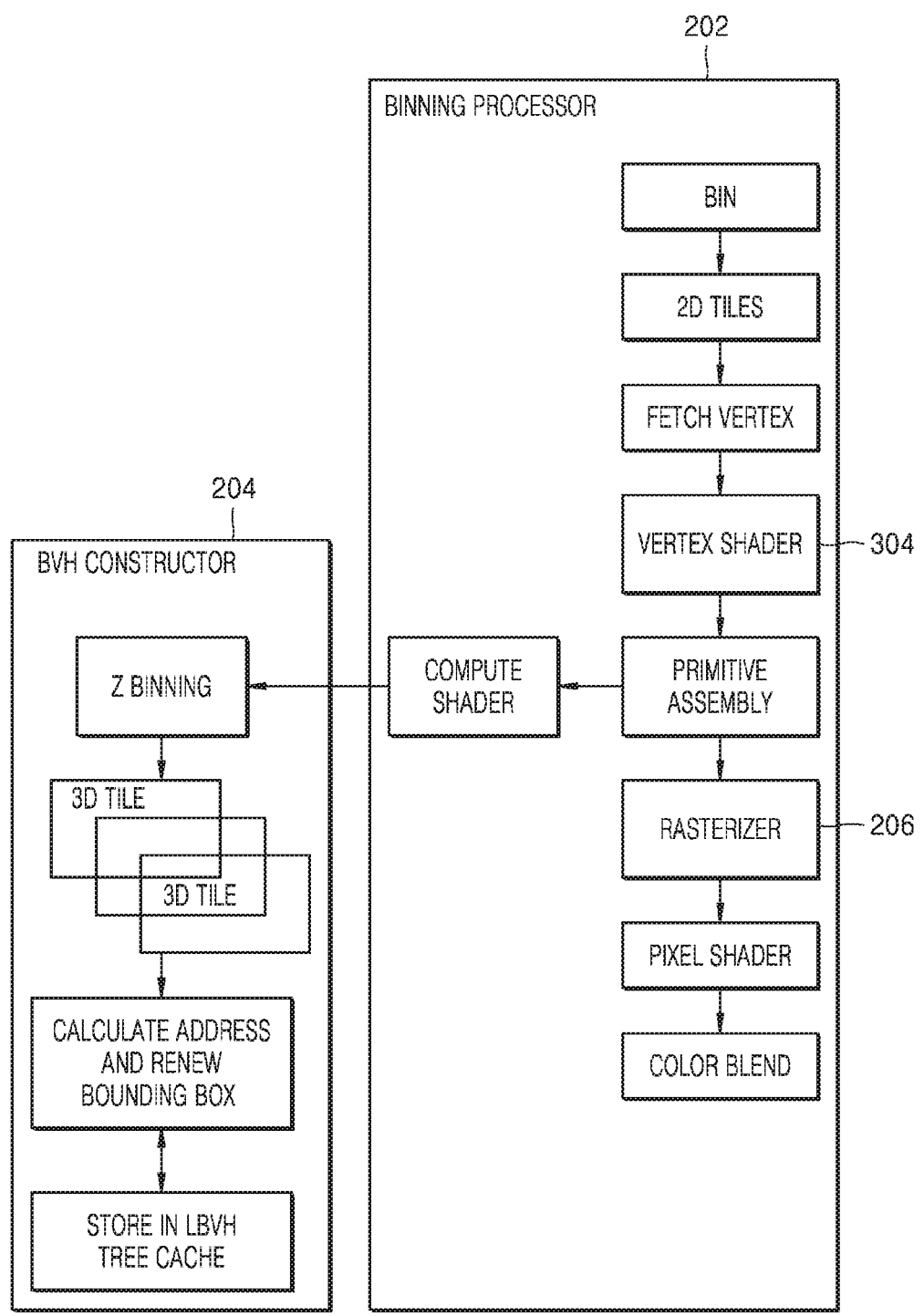
FIG. 5 is a diagram showing a lower tree conduction pipeline for constructing a lower layer of a BVH tree, according to an embodiment.

FIG. 5 is a diagram showing a lower tree construction pipeline for constructing the lower layer of the BVH tree, according to an embodiment. The binning data (which may include the 2D tiles) generated in the binning pass 108 (shown in FIG. 3) is used for constructing the lower layer of the BVH tree. The pipeline for constructing the lower layer of the BVH tree is shown in FIG. 5. Referring to FIG. 5, the 2D tiles are obtained from the binning processor 202, and the 2D tiles may be converted into the 3D tiles in the BVH constructor 204.

As shown in FIG. 5, the 2D tiles are obtained from each bin. After primitives for the 2D tiles are obtained and vertex shading and primitive assembly operations (required in rasterization) are performed, a compute shader is executed, and thus all primitives may be sorted based on their Morton codes. Then, a Z binning processor converts the 2D tiles along the Z dimension to output 3D tiles. The 3D tiles are provided as inputs to the cache-based fixed function hardware to construct the BVH tree.

Figure 6:
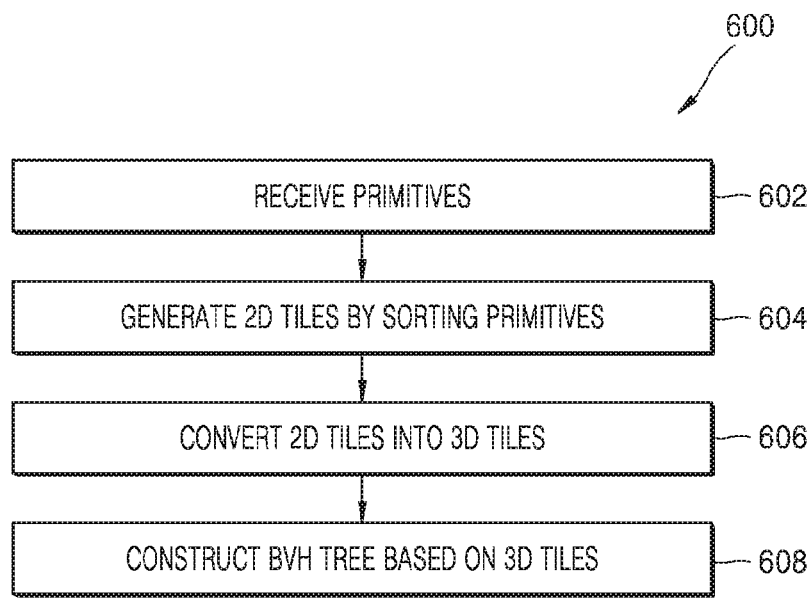
FIG. 6 is a flowchart of a method of constructing a BVH tree, according to an embodiment.

FIG. 6 is a flowchart of a method 600 of constructing a BVH tree, according to an embodiment. Referring to FIG. 6, in operation 602, the binning processor 202 receives primitives. In operation 604, the binning processor 202 creates 2D tiles by sorting each primitive.

In operation 606, the 2D tiles are converted into 3D tiles. More specifically, the binning processor 202 or the BVH constructor 204 may convert each 2D tile into a 3D tile. In operation 608, the BVH constructor 204 constructs the BVH tree based on the 3D tiles. Operations of the method 600 may be performed differently from the order described in FIG. 6. Also, according to some embodiments, operations of FIG. 6 may be changed or omitted within the scope of the disclosure.

Figure 7:
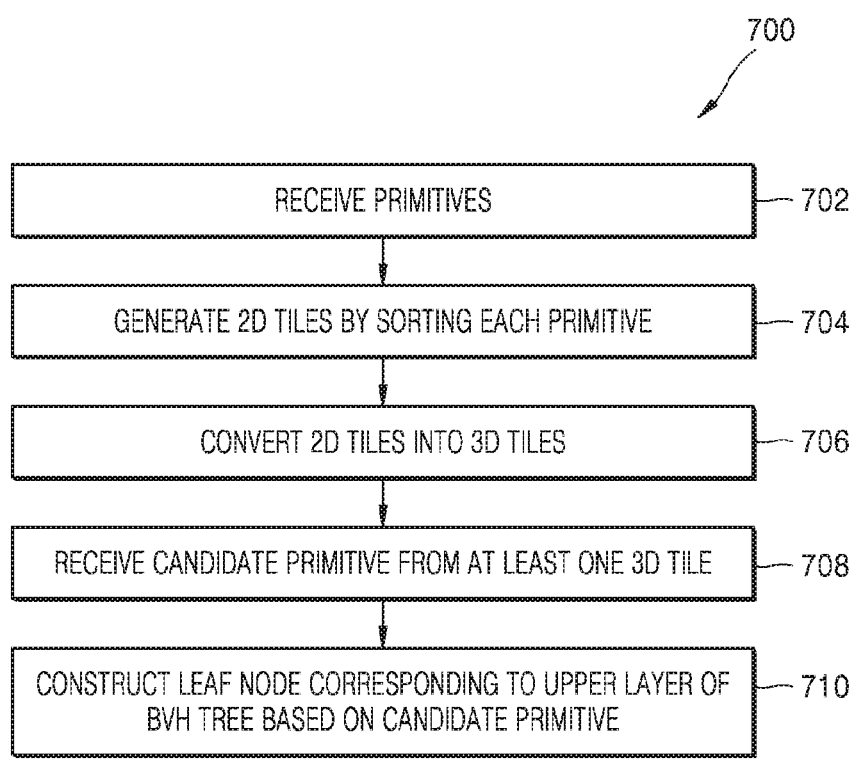
FIG. 7 is a flowchart of a method of constructing a leaf node corresponding to an upper layer of a BVH tree, according to an embodiment.

FIG. 7 is a flowchart of a method 700 of constructing a leaf node corresponding to an upper layer of a BVH tree, according to an embodiment. Referring to FIG. 7, in operation 702, the binning processor 202 receives primitives. In operation 704, the binning processor 202 creates the 2D tiles by sorting each primitive.

In operation 706, the 2D tiles are converted into the 3D tiles. More specifically, the binning processor 202 or the BVH constructor 204 may convert each 2D tile into a 3D tile. In operation 708, the BVH constructor 204 receives a candidate primitive from the 3D tiles. In operation 710, the BVH constructor 204 constructs the leaf node corresponding to the upper layer of the BVH tree based on the candidate primitive. Operations of the method 700 may be performed differently from the order described in FIG. 7. Also, according to some embodiments, operations of FIG. 7 may be changed or omitted within the scope of the disclosure.

Figure 8:
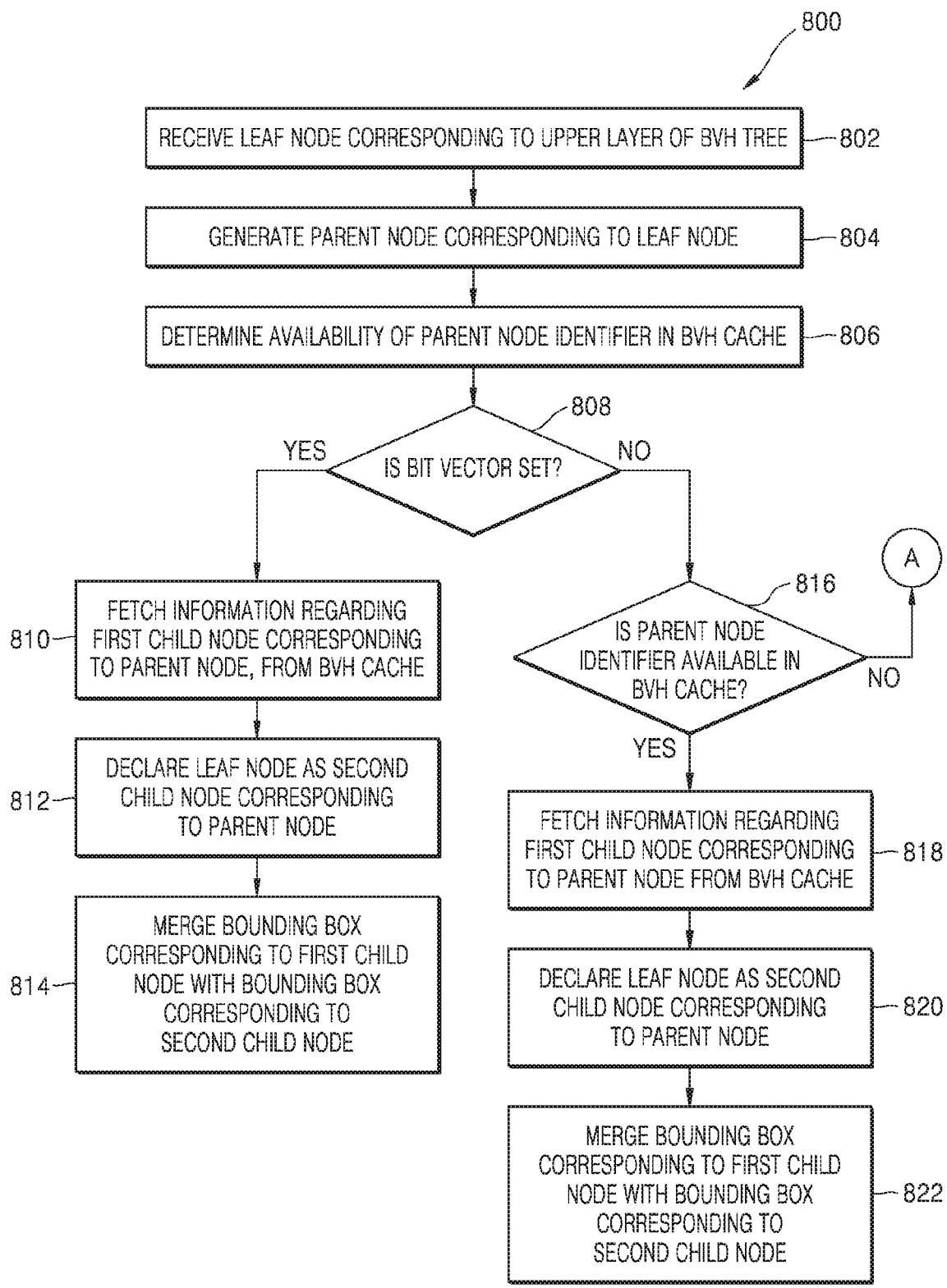
FIGS. 8 and 9 are flowcharts of a method of constructing a lower layer of a BVH tree, according to an embodiment.
Figure 9:
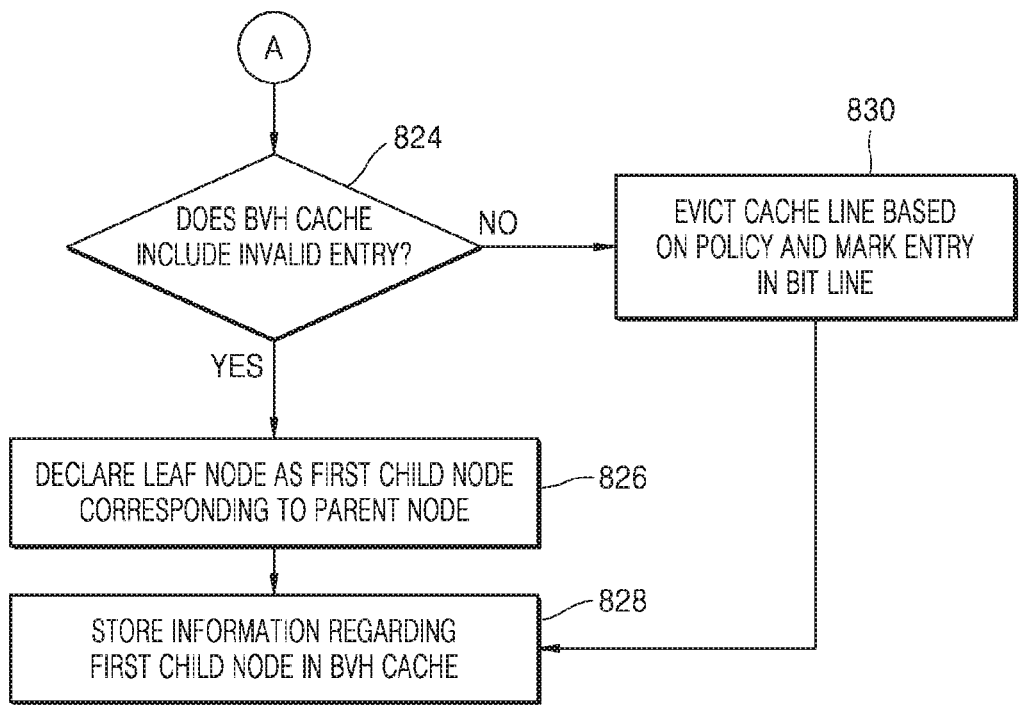

FIGS. 8 and 9 are flowcharts of a method 800 of constructing the lower layer of the BVH tree, according to an embodiment. Referring to FIG. 8, in operation 802, the BVH constructor 204 receives the leaf node corresponding to the upper layer of the BVH tree.

In operation 804, the BVH constructor 204 generates a parent node corresponding to the leaf node. The generated parent node may be associated with a parent node identifier. In operation 806, the BVH constructor 204 determines the availability of the parent node identifier in the BVH cache 404. In an embodiment, the availability of the parent node identifier in the BVH cache 404 may be determined by determining or checking a bit vector.

In operation 808, the BVH constructor 204 determines whether the bit vector is set. If it is determined that the bit vector is set, in operation 810, the BVH constructor 204 fetches information regarding a first child node corresponding to the parent node from the BVH cache 404. In operation 812, the BVH constructor 204 declares the leaf node as a second child node corresponding to the parent node. In operation 814, the BVH constructor 204 merges a bounding box corresponding to the first child node and a bounding box corresponding to the second child node with each other.

Alternatively, if it is determined in operation 808 that the bit vector is not set, the BVH constructor 204 determines whether the parent node identifier is available in the BVH cache 404 in operation 816. In operation 818, the BVH constructor 204 fetches information regarding the first child node corresponding to the parent node from the BVH cache 404. In operation 820, the BVH constructor 204 declares the leaf node as the second child node corresponding to the parent node. In operation 822, the BVH constructor 204 merges a bounding box corresponding to the first child node and a bounding box corresponding to the second child node with each other.

If it is determined in operation 816 that the parent node identifier is unavailable in the BVH cache 404, the BVH constructor 204 determines whether the BVH cache 404 has an invalid entry in operation 824. If it is determined that the BVH cache has an invalid entry, in operation 826, the BVH constructor 204 declares the leaf node as the first child node corresponding to the parent node. In operation 828, the BVH constructor 204 stores the information regarding the first child node in the BVH cache 404.

Alternatively, if it is determined in operation 824 that the BVH cache 404 does not have an invalid entry, the BVH constructor 204 evicts a cache line of the BVH cache 404 using a policy and marks entry in a bit line of the BVH cache 404 in operation 830.

Operations of the method 800 may be performed differently from the order described in FIGS. 8 and 9. Also, according to some embodiments, operations of FIGS. 8 and 9 may be changed or omitted within the scope of the present disclosure.

Figure 10:
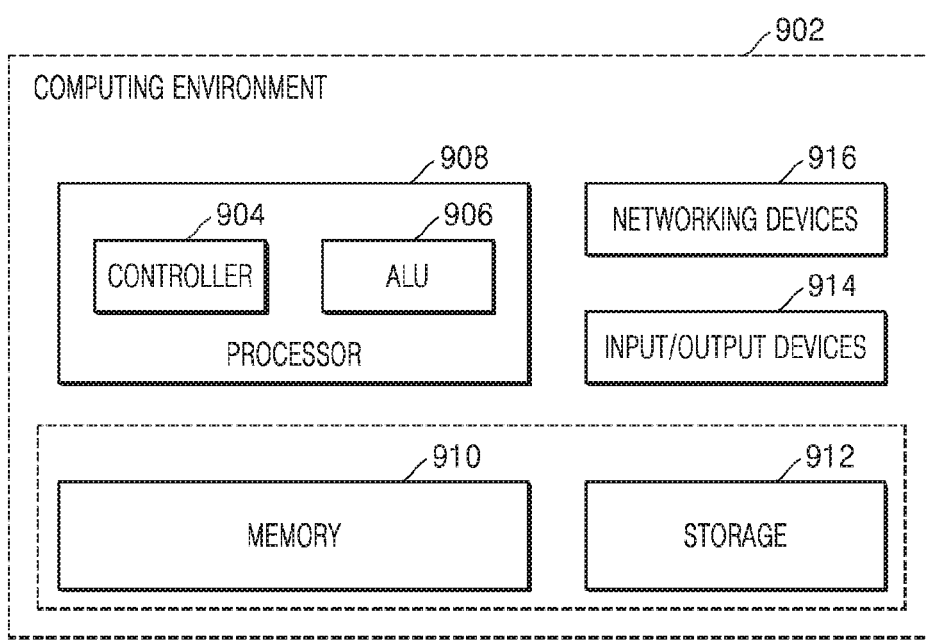
FIG. 10 is a block diagram of a computing environment in which a method for parallel coding of slice segments is executed, according to an embodiment.

FIG. 10 is a block diagram of a computing environment 902 in which a method for parallel coding of slice segments is executed, according to an embodiment. In FIG. 10, the computing environment 902 includes at least one processor 908 that is equipped with a controller 904 and an Arithmetic Logic Unit (ALU), or Arithmetic Logic, 906, a memory 910, a storage 912, networking devices 916, and input output (I/O) devices 914. The processor 908 processes instructions of an algorithm. The processor 908 receives commands from the controller 904 in order to perform processing. Also, logical and arithmetic operations involved in the execution of the instructions may be computed with the assistance of the ALU 906.

The overall computing environment 902 may have multiple homogeneous and/or heterogeneous cores, multiple CPUs of different kinds, special media and other accelerators. The processor 908 may process the instructions of the algorithm. Also, the processor 908 may be located on a single chip or over multiple chips.

The algorithm including instructions and codes required for the implementation may be stored in one or both of the memory 910 and the storage 912. The instructions are fetched from the memory 910 or the storage 912 and executed by the processor 908.

Various networking devices 916 or external I/O devices 914 may be connected in the computing environment 902 to support the implementation of hardware through a networking unit and an I/O device unit.

The GPU 102, the CPU 104 and the storage 106 in FIG. 1, the binning processor 202 in FIGS. 2, 3 and 5, the BVH constructor 204 of FIGS. 2, 4 and 5, the rasterizer 206 in FIGS. 2 and 5, the ray tracer 208 in FIG. 2, the attribute fetch processor 302 of FIG. 3, the vertex shader 304 of FIGS. 3 and 5, the primitive transformer 306 of FIG. 3, the address calculator 402, the BVH cache 404, the L2 cache 406, the DRAM 408 and the bounding box merger 410 in FIG. 4, and the controller 904, the ALU 906, the processor 908, the memory 910, the storage 912, the input/output devices 914 and the networking devices 916 in FIG. 10 that perform the operations described in this application are implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 3 and 5-9 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method of constructing a bounding volume hierarchy (BVH) tree, the method comprising:
    executing, by a central processing unit (CPU), a graphics processing unit (GPU), and an accelerator driven of the GPU, operations comprising:
    generating, by the GPU, 2-dimensional (2D) tiles comprising primitives, wherein the 2D tiles are generated according to a sorting of the primitives;
    converting, by the GPU, the 2D tiles into 3-dimensional (3D) tiles based at least in part on a binning of the 2D tiles; and
    constructing the BVH tree based on the 3D tiles, wherein a lower layer of the BVH tree is constructed by the accelerator and an upper layer of the BVH tree is constructed by the CPU,
    wherein the constructing of the BVH tree comprises:
    receiving a candidate primitive from one of the 3D tiles;
    constructing a leaf node corresponding to the upper layer of the BVH tree based on the candidate primitive;
    generating a parent node corresponding to the leaf node and associated with a parent node identifier;
    determining an availability of the parent node identifier in a BVH cache; and
    constructing the lower layer of the BVH tree based on the availability of the parent node identifier.

2. The method of claim 1, wherein the 3D tiles are sequentially received to construct the BVH tree.

3. The method of claim 1, wherein the generating of the 2D tiles comprises:
    receiving the primitives; and
    generating the 2D tiles by sorting the primitives into different bins, based on locations of vertices of the primitives.

4. The method of claim 1, wherein the constructing of the lower layer comprises:
    determining whether a bit vector is set, wherein the bit vector indicates the availability of the parent node identifier;
    fetching information regarding a first child node corresponding to the parent node from the BVH cache, in response to the bit vector being set;
    declaring the leaf node as a second child node corresponding to the parent node; and
    merging a bounding box corresponding to the first child node with a bounding box corresponding to the second child node.

5. The method of claim 1, wherein the constructing of the lower layer comprises:
    determining whether a bit vector is not set;
    determining whether the parent node identifier is available in the BVH cache, in response to the bit vector not being set;
    fetching information regarding a first child node corresponding to the parent node from the BVH cache, in response to the parent node identifier being available;
    declaring the leaf node as a second child node corresponding to the parent node; and
    merging a bounding box corresponding to the first child node with a bounding box corresponding to the second child node.

6. The method of claim 1, wherein the constructing of the lower layer comprises:
    determining whether a bit vector is set;
    determining whether the parent node identifier is available in the BVH cache, in response to the bit vector not being set;
    declaring a first child node corresponding to the parent node as the leaf node, in response to the parent node identifier not being available; and
    storing information regarding the first child node in the BVH cache.

7. A non-transitory computer-readable medium storing instructions that, when executed by a processor, cause the processor to perform the method of claim 1.

8. A method of constructing a bounding volume hierarchy (BVH) tree, the method comprising:
    receiving a leaf node corresponding to an upper layer of the BVH tree;
    generating a parent node corresponding to the leaf node and associated with a parent node identifier;

determining whether a bit vector is set, wherein the bit vector indicates that a first child node corresponding to the parent node has been evicted from a BVH cache to a level 2 (L2) cache;

determining an availability of the parent node identifier in the BVH cache based on whether the bit vector is set; and constructing a lower layer of the BVH tree based on the availability of the parent node identifier.

9. The method of claim 8, further comprising:

fetching information regarding the first child node from the L2 cache via the BVH cache, in response to the bit vector being set;

declaring the leaf node as a second child node corresponding to the parent node; and merging a bounding box corresponding to the first child node with a bounding box corresponding to the second child node.

10. The method of claim 8, wherein the constructing of the lower layer comprises:

determining whether the parent node identifier is available in the BVH cache, in response to the bit vector not being set;

fetching information regarding a first child node corresponding to the parent node from the BVH cache, in response to the parent node identifier being available;

declaring the leaf node as a second child node corresponding to the parent node; and merging a bounding box corresponding to the first child node with a bounding box corresponding to the second child node.

11. The method of claim 8, wherein the constructing of the lower layer comprises:

determining whether the parent node identifier is available in the BVH cache, in response to the bit vector not being set;

declaring the leaf node as the first child node, in response to the parent node identifier not being available in the BVH cache; and storing information regarding the first child node in the BVH cache.

12. The method of claim 8, wherein the leaf node is sequentially received to construct the BVH tree.

13. A non-transitory computer-readable medium storing instructions that, when executed by a processor, cause the processor to perform the method of claim 8.

14. A system to construct a bounding volume hierarchy (BVH) tree, the system comprising a graphics processing unit (GPU), the GPU further comprising:

a binning processor configured to generate 2-dimensional (2D) tiles comprising primitives, wherein the 2D tiles are generated according to a sorting of the primitives and convert the 2D tiles into 3-dimensional (3D) tiles based at least in part on a binning of the 2D tiles;

one or more shader cores configured to generate an upper layer of the BVH tree; and a BVH constructor configured to construct a lower layer of the BVH tree based on the 3D tiles, wherein the BVH constructor comprises a cache-based fixed function hardware circuit.

15. The system of claim 14, wherein the 3D tiles are sequentially received to construct the BVH tree.

16. The system of claim 14, wherein the binning processor is configured to receive the primitives and generate the 2D tiles by sorting the primitives into different bins based on locations of vertices of the primitives.

17. The system of claim 14, wherein the BVH constructor is configured to:

receive candidate primitives from at least one of the 3D tiles;

construct a leaf node corresponding to an upper layer of the BVH tree based on the candidate primitives;

generate a parent node corresponding to the leaf node and associated with a parent node identifier;

determine an availability of the parent node identifier in a BVH cache; and construct a lower layer of the BVH tree based on the availability of the parent node identifier.

18. A system for constructing a bounding volume hierarchy (BVH) tree, the system comprising:

a graphics processing unit (GPU) comprising a BVH constructor comprising a BVH cache and a level 2 (L2) cache, wherein the BVH constructor is configured to:

receive a leaf node corresponding to an upper layer of the BVH tree, generate a parent node corresponding to the leaf node and associated with a parent node identifier, determine whether a bit vector is set, wherein the bit vector indicates that a first child node corresponding to the parent node has been evicted from the BVH cache to the L2 cache;

determine an availability of the parent node identifier in the BVH cache based on whether the bit vector is set, and construct a lower layer of the BVH tree based on the availability of the parent node identifier.

19. The system of claim 18, wherein the BVH constructor is configured to:

fetch information regarding a first child node corresponding to the parent node from the L2 cache via the BVH cache, in response to the bit vector being set;

declare the leaf node as a second child node corresponding to the parent node; and merge a bounding box corresponding to the first child node with a bounding box corresponding to the second child node.

* * * * *